United States Patent
Gruver

(10) Patent No.: US 11,971,536 B2
(45) Date of Patent: *Apr. 30, 2024

(54) DYNAMIC MATRIX FILTER FOR VEHICLE IMAGE SENSOR

(71) Applicant: UATC, LLC, San Francisco, CA (US)

(72) Inventor: Daniel Gruver, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,176

(22) Filed: Jan. 17, 2022

(65) Prior Publication Data

US 2022/0137272 A1 May 5, 2022

Related U.S. Application Data

(63) Continuation of application No. 16/460,421, filed on Jul. 2, 2019, now Pat. No. 11,256,013.

(Continued)

(51) Int. Cl.
*G02B 26/02* (2006.01)
*G02B 5/20* (2006.01)
(Continued)

(52) U.S. Cl.
CPC ............ *G02B 26/023* (2013.01); *G02B 5/204* (2013.01); *G05D 1/0246* (2013.01); *G06V 10/25* (2022.01);
(Continued)

(58) Field of Classification Search
None
See application file for complete search history.

(56) References Cited

U.S. PATENT DOCUMENTS 6,753,909 B1 * 6/2004 Westerman ............ H04N 23/75
348/297
7,016,518 B2  3/2006 Vernon
(Continued)

FOREIGN PATENT DOCUMENTS

| KR | 20070069653 A | 7/2007 |
| KR | 20130057603 A | 6/2013 |
| KR | 20150134019 A | 12/2015 |

OTHER PUBLICATIONS

"U.S. Appl. No. 16/460,421, Examiner Interview Summary dated Aug. 5, 2021", 2 pgs.
(Continued)

*Primary Examiner* — James M Anderson, II
(74) *Attorney, Agent, or Firm* — Schwegman Lundberg & Woessner, P.A.

(57) ABSTRACT

Aspects of the present disclosure include systems, methods, and devices use a controllable matrix filter to selectively obscure regions of an image sensor's field of view. The controllable matrix filter is a physical component that may be placed in front of an image sensor and, in certain situations, one or more regions of the otherwise transparent matrix filter may be selectively configured to have an increased optical density such that the one or more regions become opaque thereby blocking out certain regions of the image sensor's field of view. In this way, the controllable matrix filter may be used to mask out certain regions in an image sensor's field of view that may present processing difficulties for downstream systems that utilize information from the image sensor.

27 Claims, 13 Drawing Sheets

Related U.S. Application Data

(60) Provisional application No. 62/824,973, filed on Mar. 27, 2019.

(51) Int. Cl.
*G05D 1/00* (2006.01)
*G06V 10/25* (2022.01)
*G06V 10/60* (2022.01)
*G06V 20/56* (2022.01)
*H04N 23/62* (2023.01)
*G01C 21/26* (2006.01)

(52) U.S. Cl.
CPC .............. *G06V 10/60* (2022.01); *G06V 20/56* (2022.01); *H04N 23/62* (2023.01); *G01C 21/26* (2013.01)

(56) References Cited

U.S. PATENT DOCUMENTS

| | | |
|---|---|---|
| 7,596,242 B2 | 9/2009 | Breed et al. |
| 7,612,803 B2 | 11/2009 | Meitav et al. |
| 7,800,662 B2 | 9/2010 | Sumiya |
| 10,048,696 B2 | 8/2018 | Meyhofer et al. |
| 2019/0281202 A1* | 9/2019 | Chen ..................... H04N 5/33 |
| 2020/0259985 A1* | 8/2020 | Takahashi .............. G03B 13/16 |
| 2020/0310013 A1 | 10/2020 | Gruver |

OTHER PUBLICATIONS

"U.S. Appl. No. 16/460,421, Non Final Office Action dated Apr. 29, 2021", 17 pgs.

"U.S. Appl. No. 16/460,421, Notice of Allowance dated Oct. 14, 2021", 8 pgs.

"U.S. Appl. No. 16/460,421, Response filed Jul. 29, 2021 to Non Final Office Action dated Apr. 29, 2021", 11 pgs.

* cited by examiner

DYNAMIC MATRIX FILTER FOR VEHICLE IMAGE SENSOR

CLAIM FOR PRIORITY

This application is a continuation of U.S. application Ser. No. 16/460,421, filed Jul. 2, 2019, which claims the benefit of priority to U.S. Provisional Application No. 62/824,973, filed Mar. 27, 2019, each of which is hereby incorporated by reference in its entirety.

TECHNICAL FIELD

The subject matter disclosed herein relates to vehicle image sensors. In particular, example embodiments may relate to a dynamic matrix filter for a vehicle image sensor.

BACKGROUND

Image sensors, such as camera systems, are often used in autonomous vehicles (AVs) to aid the vehicle in navigating through surrounding environments. Image sensors used for AVs often have insufficient dynamic range to properly capture very bright or very dark regions of the surrounding environment. As a result, accuracy of downstream processing that relies upon information from the image sensors may be negatively impacted. As an example, if an AV is driving toward a bright source of light such as the sun or headlights of another vehicle, image sensors may be unable to capture a discernable image of a traffic sign or signal that is perceptible to downstream processing systems because bright light from the source may saturate regions of the image data generated by the image sensor. As a result, the downstream processing may not be able to properly account for what is being signaled by the traffic signal or sign.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
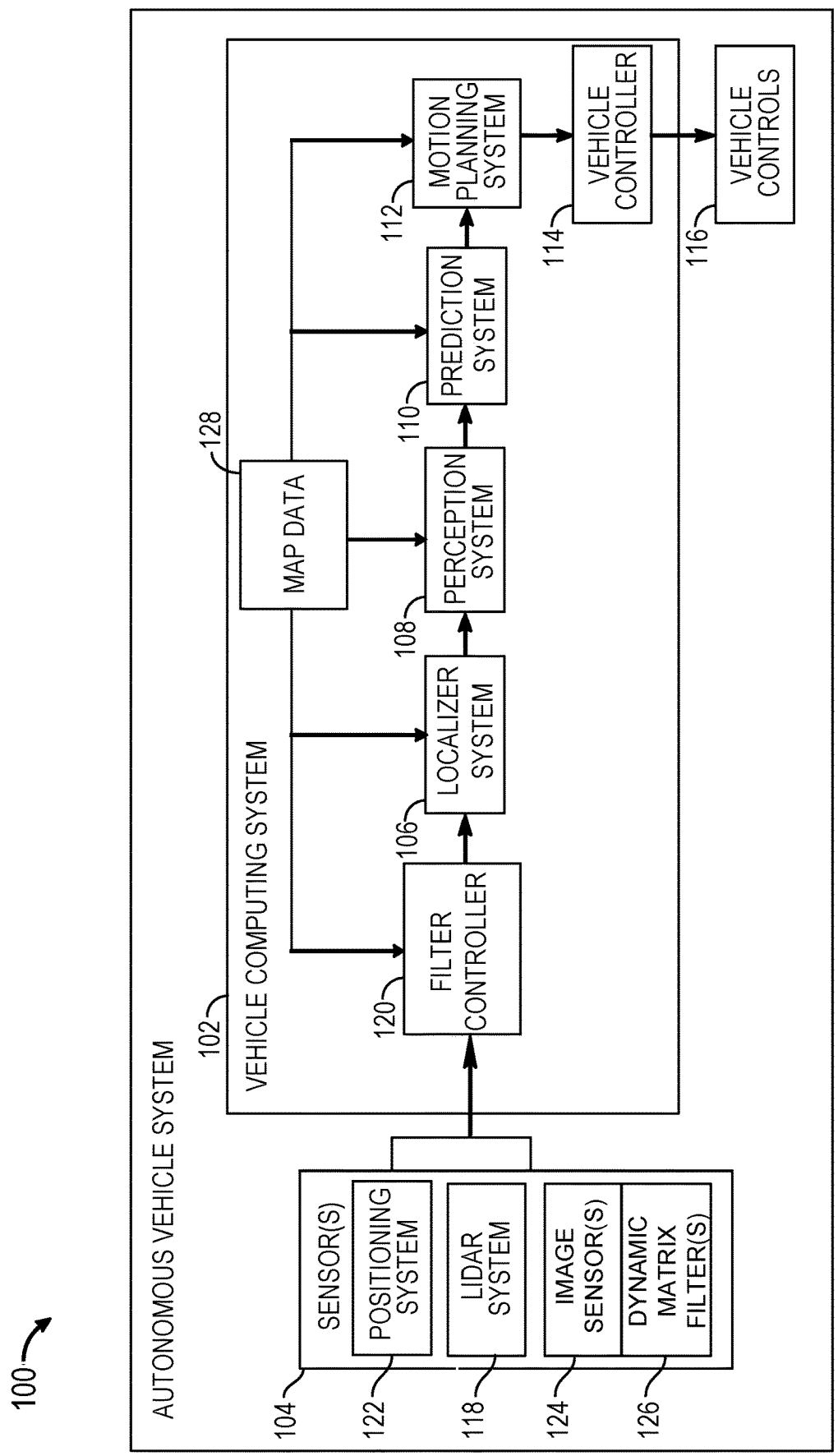
FIG. 1 is a block diagram illustrating an example autonomous vehicle (AV) system, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the forgoing issues with vehicular image sensor systems and others with systems, methods, and devices to improve vehicular image sensor dynamic range using a dynamic matrix filter to selectively obscure regions of an image sensor's field of view. The dynamic matrix filter is a physical component that may be placed in front of an image sensor and in certain situations, one or more regions of the otherwise transparent dynamic matrix filter may be selectively configured to have an increased optical density such that the one or more regions become opaque thereby blocking out certain regions of the image sensor's field of view. Optical density comprises a measurement of a refractive medium ability to slow or delay the transmission of light. Because regions of the dynamic matrix filter have individually adjustable optical densities, the dynamic matrix filter may be used to selectively mask out certain regions in an image sensor's field of view that may present processing difficulties for downstream systems that utilize information from the image sensor.

For example, in situations where a traffic signal is within an image sensor's field of view and a bright source of light (e.g., the sun or headlights of another vehicle) is near the traffic signal within the image sensor's field of view, an optical density of the dynamic matrix filter may be increased in all regions except where the traffic signal is expected to be to block out the bright source of light. By blocking the regions of the image sensor's field of view that include the bright source of light, the image sensor needs only enough dynamic range to resolve the traffic signal color without having the sensor flooded with bright light.

Consistent with some embodiments, an autonomous vehicle (AV) system comprises an image sensor, a dynamic matrix filter, and a filter controller. The image sensor generates image data comprising a depiction of a real-world scene that is visible within a field of view of the image sensor. The dynamic matrix filter is positioned within the field of view of the image sensor and comprises an array of elements, each of which has an adjustable optical density. That is, the optical density of an individual element in the array of elements may be increased to cause the element to become opaque to block out a region of the field of view of the image sensor. As an example, the dynamic matrix filter may comprise a liquid crystal display (LCD).

The filter controller generates control signals and transmits the control signals to the dynamic matrix display to adjust the optical density of elements in the array of elements. For example, the filter controller detects a region of interest (e.g., a traffic signal) in a field of view of the image sensor. The filter controller may detect the region of interest based on any one or more of map data, vehicle pose data, and image data produced by the image sensor or another image sensor. The filter controller selects a target region in the field of view of the image sensor (e.g., a source of bright light) based on the region of interest. The filter controller generates and transmits a control signal to the dynamic matrix filter to cause the dynamic matrix filter to physically obscure the target region in the field of view of the dynamic matrix filter.

The dynamic matrix filter physically obscures the target region in the field of view of the dynamic matrix by adjusting the optical density of one or more elements of the array of elements. For example, the dynamic matrix filter may increase the optical density of one or more elements in the array of elements from a default optical density (e.g., transparent) to an optical density specified by the control signal. The image sensor generates subsequent image data with the target region in the field of view of the image sensor having an adjusted optical density. Downstream processing systems may determine a motion plan for the AV system based on the subsequent image data, which may be more suitable since the obscured target region may otherwise presenting processing difficulties. The downstream processing systems use the determined motion plan to control one or more operations of the AV system.

Consistent with some embodiments, the filter controller may generate controls signals based on a predetermined mapping between the array of elements and the field of view of the image sensor. For example, the image sensor may comprise a focal plane array and each element in the array of elements may be mapped to a light-sensing pixel in the focal plane array. The mapping may, for example, be a 1:1 mapping where each pixel in the focal plane array has a corresponding element in the array of elements. The image sensor may further comprise a lens system and depending on the embodiment, the dynamic matrix filter may be positioned in front of the lens system or between the focal plane array and the lens system.

Control signals generated by the filter control specify an optical density for each element that corresponds to the target region and, in some instances, the control signals may specify a different optical density for sub-regions within the target region. For example, the filter controller may specify a first optical density for a first sub-region of the target region and a second optical density for a second sub-region of the target region.

In some embodiments, the target region in the field of view of the image sensor selected by the filter controller corresponds to the region of interest. Consistent with these embodiments, the filter controller generates a control signal to cause the dynamic matrix filter to physically obscure a region of the field of view of the image sensor corresponding to the region of interest.

In some embodiments, the target region in the field of view of the image sensor corresponds to a region in the field of view of the image sensor other than the region of interest. Consistent with these embodiments, the filter controller generates a control signal to cause the dynamic matrix filter to physically obscure a region in the field of view of the image sensor that corresponds to a region other than the region of interest (e.g., the remaining region(s) in the image data).

Consistent with some embodiments, the detecting of the region of interest in the field of view of the image sensor by the filter controller comprises accessing map data comprising a map of an area that includes a location of the AV system and information describing one or more features of the area and accessing vehicle pose data comprising a position and an orientation of the AV system. The filter controller determines the region of interest in the field of view of the image sensor based on a comparison of the map data and the vehicle pose data. For example, the filter controller may identify the region of interest based on the known position and orientation of the AV system and a known location of a traffic signal provided by the map data. Consistent with these embodiments, the selecting of the target region in the field of view of the image sensor comprises selecting a remaining region in the field of view of the image sensor as the target region where the remaining region excludes the region of interest.

Consistent with some embodiments, the detecting of the region of interest by the filter controller comprises analyzing image data produced by the image sensor or another image sensor to identify a saturated region (e.g., a region in the image data having a saturation that exceeds a saturation threshold). Consistent with these embodiments, the selecting of the target region comprises mapping the saturated region in the image data to the target region in the field of view of the image sensor. As explained above, the filter controller generates and transmits a control signal to cause the dynamic matrix filter to adjust the optical density of one or more elements in the array of elements. In generating the control signal, the filter controller may cause the dynamic matrix filter to change the optical density of one or more elements to a first optical density. If the controller determines that the saturated region in subsequent image data (i.e., the image data generated after increasing the optical density of the target region of the field of view of the image sensor) satisfies a saturation condition, the controller may generate an additional control signal to cause the dynamic matrix filter to adjust the optical density of the one or more elements to a second optical density.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the AV system 100 to facilitate additional functionality that is not specifically described herein.

The AV system 100 is responsible for controlling a vehicle. The AV system 100 is capable of sensing its environment and navigating without human input. The AV system 100 can include a ground-based autonomous vehicle (e.g., car, truck, bus, etc.), an air-based autonomous vehicle (e.g., airplane, drone, helicopter, or other aircraft), or other types of vehicles (e.g., watercraft).

The AV system 100 includes a vehicle computing system 102, one or more sensors 104, and one or more vehicle controls 116. The vehicle computing system 102 can assist in controlling the AV system 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 116 to operate the AV system 100 according to the motion path.

As illustrated in FIG. 1, the vehicle computing system 102 can include one or more computing devices that assist in controlling the AV system 100. Vehicle computing system 102 can include a localizer system 106, a perception system 108, a prediction system 110, a motion planning system 112, and a filter controller 120 that cooperate to perceive the dynamic surrounding environment of the AV system 100 and determine a trajectory describing a proposed motion path for the AV system 100. Vehicle computing system 102 can additionally include a vehicle controller 114 configured to control the one or more vehicle controls 116 (e.g., actuators that control gas flow (propulsion), steering, braking, etc.) to execute the motion of the AV system 100 to follow the trajectory.

In particular, in some implementations, any one of the localizer system 106, the perception system 108, the prediction system 110, the motion planning system 112, or the filter controller 120 can receive sensor data from the one or more sensors 104 that are coupled to or otherwise included within the AV system 100. As examples, the one or more sensors 104 can include a Lidar system 118, a Radio Detection and Ranging (RADAR) system, one or more image sensors 124 (e.g., camera systems such as visible spectrum cameras, infrared cameras, etc.), and/or other sensors 104. The sensor data can include information that describes the location of objects within the surrounding environment of the AV system 100.

As an example, for image sensor(s) 124, the sensor data can include image data generated by the one or more image sensor(s) 124. The image data may include one or more image frames (also referred to simply as "images) depicting a real-world scene that is within the field of view of an image sensor 124. Various processing techniques (e.g., range imaging techniques such as, for example, structure from motion, structured light, stereo triangulation, and/or other techniques) can be performed to identify the location (e.g., in three-dimensional space relative to an image sensor 124) of a number of points that correspond to objects that are depicted in imagery captured by the image sensor(s) 124. Other sensor systems can identify the location of points that correspond to objects as well.

As another example, for Lidar system 118, the sensor data can include point data that includes the location (e.g., in three-dimensional space relative to the Lidar system 118) of a number of points that correspond to objects that have reflected an emitted light. For example, Lidar system 118 can measure distances by measuring the ToF that it takes a short light pulse to travel from the sensor(s) 104 to an object and back, calculating the distance from the known speed of light. The point data further includes an intensity value for each point that can provide information about the reflectiveness of the objects that have reflected an emitted light.

As yet another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As another example, the one or more sensors 104 can include a positioning system 122. The positioning system 122 can determine a current position of the AV system 100. The positioning system 122 can be any device or circuitry for analyzing the position of the AV system 100. For example, the positioning system 122 can determine position by using one or more of inertial sensors; a satellite positioning system, based on Internet Protocol (IP) address, by using triangulation and/or proximity to network access points or other network components (e.g., cellular towers, WiFi access points, etc.); and/or other suitable techniques. The position of the AV system 100 can be used by various systems of the vehicle computing system 102.

Thus, the one or more sensors 104 can be used to collect sensor data that includes information that describes the location (e.g., in three-dimensional space relative to the AV system 100) of points that correspond to objects within the surrounding environment of the AV system 100.

In addition to the sensor data, the perception system 108, prediction system 110, motion planning system 112, and/or the filter controller 120 can retrieve or otherwise obtain map data 128 that provides detailed information about the surrounding environment of the AV system 100. The map data 128 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data 128 that provides information that assists the vehicle computing system 102 in comprehending and perceiving its surrounding environment and its relationship thereto.

In addition, according to an aspect of the present disclosure, the map data 128 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The filter controller 120 receives some or all of the image data generated by the image sensor(s) 124 and generates control signals to cause dynamic matrix filter(s) 126 to physically obscure one or more regions in the field of view of the image sensor(s) 124. A dynamic matrix filter 126 is a physical component that may be placed in front of an image sensor 124 and in certain situations, one or more regions of the otherwise transparent dynamic matrix filter 126 may be selectively configured to have an increased optical density such that the one or more regions become opaque thereby blocking out certain regions in the field of view of the image sensor 124. For example, the filter controller 120 may detect a bright source of light such as the sun or headlights of another vehicle in the field of view of the image sensor 124 and in response, the filter controller 120 may generate and transmit a control signal to the dynamic matrix filter 126 that causes the dynamic matrix filter 126 to physically obscure the region in the field of view of the image sensor 124 that corresponds to the bright source of light. As will be discussed in further detail below, the dynamic matrix filter 126 obscures the region of the field of view of the image sensor 124 by selectively increasing an optical density of one or more elements in the region that have an adjustable optical density.

The localizer system 106 receives the map data 128 and some or all of the sensor data from sensors 104 and generates vehicle poses for the AV system 100. A vehicle pose describes the position and attitude of the vehicle. The position of the AV system 100 is a point in a three-dimensional space. In some examples, the position is described by values for a set of Cartesian coordinates, although any other suitable coordinate system may be used. The attitude of the AV system 100 generally describes the way in which the AV system 100 is oriented at its position. In some examples, attitude is described by a yaw about the vertical axis, a pitch about a first horizontal axis, and a roll about a second horizontal axis. In some examples, the localizer system 106 generates vehicle poses periodically (e.g., every second, every half second, etc.). The localizer system 106 appends time stamps to vehicle poses, where the time stamp for a pose indicates the point in time that is described by the pose. The localizer system 106 generates vehicle poses by comparing sensor data (e.g., remote sensor data) to map data 128 describing the surrounding environment of the AV system 100.

In some examples, the localizer system 106 includes one or more localizers and a pose filter. Localizers generate pose estimates by comparing remote sensor data (e.g., Lidar, RADAR, etc.) to map data 128. The pose filter receives pose estimates from the one or more localizers as well as other sensor data such as, for example, motion sensor data from an IMU, encoder, odometer, and the like. In some examples, the pose filter executes a Kalman filter or other machine learning algorithm to combine pose estimates from the one or more localizers with motion sensor data to generate vehicle poses.

The perception system 108 can identify one or more objects that are proximate to the AV system 100 based on sensor data received from the one or more sensors 104 and/or the map data 128. In particular, in some implementations, the perception system 108 can determine, for each object, state data that describes a current state of such an object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; specular or diffuse reflectivity characteristics; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the AV system 100 over time.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the AV system 100 based, at least in part, on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the AV system 100 that best navigates the AV system 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.). Nonetheless, the vehicle controller 114 can function to keep the AV system 100 reasonably close to the motion plan.

More particularly, the vehicle controller 114 can be configured to control motion of the AV system 100 to follow the motion plan. The vehicle controller 114 can control one or more of propulsion and braking systems of the AV system 100 to follow the motion plan. The vehicle controller 114 can also control steering of the AV system 100 to follow the motion plan. In some implementations, the vehicle controller 114 can be configured to generate one or more vehicle actuator commands and to further control one or more vehicle actuators provided within vehicle controls 116 in accordance with the vehicle actuator command(s). Vehicle actuators within vehicle controls 116 can include, for example, a steering actuator, a braking actuator, and/or a propulsion actuator.

Each of the localizer system 106, the perception system 108, the prediction system 110, the motion planning system 112, the filter controller 120, and the vehicle controller 114 can include computer logic utilized to provide desired functionality. In some implementations, each of the localizer system 106, the perception system 108, the prediction system 110, the motion planning system 112, the filter controller 120, and the vehicle controller 114 can be implemented in hardware, firmware, and/or software controlling a general-purpose processor. For example, in some implementations, each of the localizer system 106, the perception system 108, the prediction system 110, the motion planning system 112, the filter controller 120 and the vehicle controller 114 includes program files stored on a storage device, loaded into a memory and executed by one or more processors. In other implementations, each of the localizer system 106, the perception system 108, the prediction system 110, the motion planning system 112, the filter controller 120, and the vehicle controller 114 includes one or more sets of computer-executable instructions that are stored in a tangible computer-readable storage medium such as RAM, hard disk, or optical or magnetic media.

Figure 2:
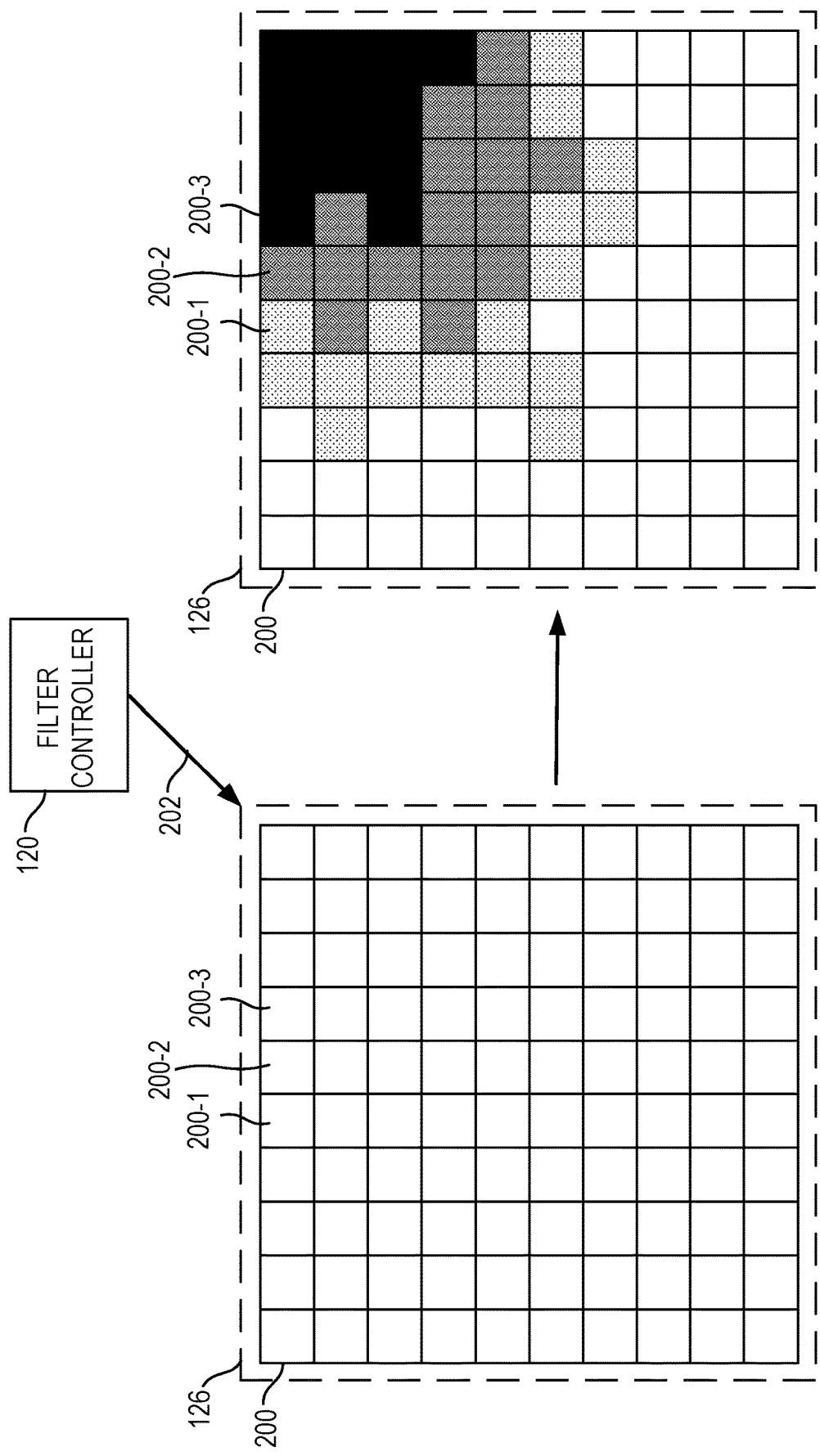
FIG. 2 is block diagram illustrating a dynamic matrix filter, which is included as part of the AV system, according to some embodiments.

FIG. 2 is block diagram illustrating a dynamic matrix filter 126, which is included as part of the AV system 100, according to some embodiments. As shown, the dynamic matrix filter 126 comprises an array of elements 200. Each element within the array of elements 200 has an adjustable optical density. That is, the optical density of each element may be increased or decreased based on a control signal 202 supplied by the filter controller 120. In a normal or default operation, each element in the array of elements 200 is set at a default optical density. For example, an element at the default optical density may be completely transparent.

In example embodiments, the array of elements 200 comprises a liquid crystal display (LCD). Consistent with these embodiments, each element is a pixel in the LCD that has an adjustable optical density.

The optical density of each individual element is adjustable, which means that optical densities may be varied across the array of elements 200. In the example illustrated in FIG. 2, elements 200-1, 200-2, and 200-3 are initially set at a default optical density. In this example, the control signal 202 supplied by the filter controller 120 may specify a first optical density for a first set of elements, a second optical density for a second set of elements, and a third optical density for a third set of elements. After receiving the control signal 202, the element 200-1 is adjusted according to the first optical density, the element 200-2 is adjusted according to the second optical density, and the element 200-3 is adjusted according to the third optical density. As shown, the second optical density is greater than the first optical density, and the third optical density is greater than the second optical density.

Figure 3A:
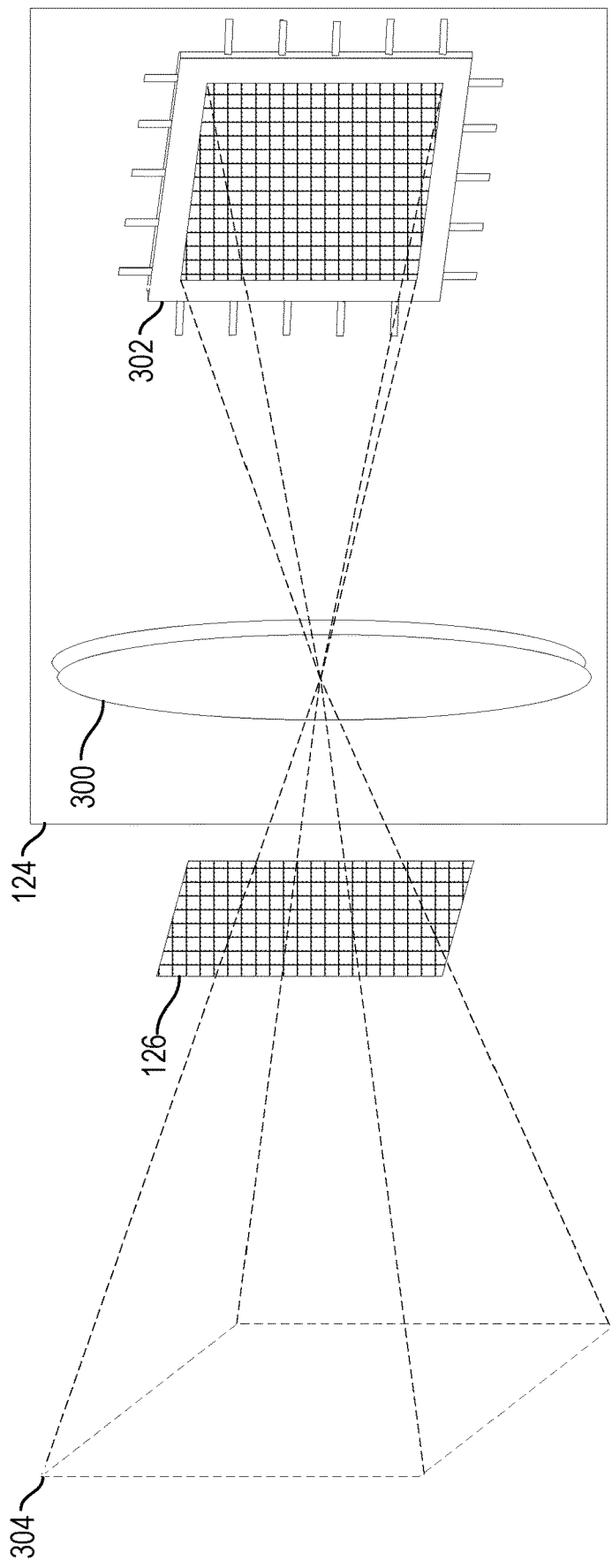
FIG. 3A is a conceptual diagram illustrating an image sensor configured to include a dynamic matrix filter, according to some embodiments.

FIG. 3A is a conceptual diagram illustrating an image sensor 124 configured to include a dynamic matrix filter 126, according to some embodiments. As shown, the image sensor 124 comprises a lens system 300 and a focal plane array 302. The lens system 300 may comprise one or more lens (e.g., camera lenses). The focal plane array 302 comprises a set of light-sensing pixels. A real-world scene 304 is visible within a field of view of the image sensor 124, which is determined, in part, by the lens system 300. A predetermined mapping may define a mapping between each light-sensing pixel in the focal plane array 302 and regions of the field of view of the image sensor 124. Each pixel in the focal plane array 302 may correspond to a pixel in image data generated by the image sensor 124.

As shown in FIG. 3A, the dynamic matrix filter 126 may be placed in front of the lens system 300. That is, the dynamic matrix filter 126 is positioned between the lens system 300 and the scene 304 that is visible within the field of view of the image sensor 124. In this way, the dynamic matrix filter 126 is placed directly in the field of view of the image sensor 124. The dynamic matrix filter 126 may be configured such that each element in the array of elements 200 of the dynamic matrix filter 126 corresponds to a region of the field of view of the image sensor 124 and/or one or more pixels in the focal plane array 302.

Figure 3B:
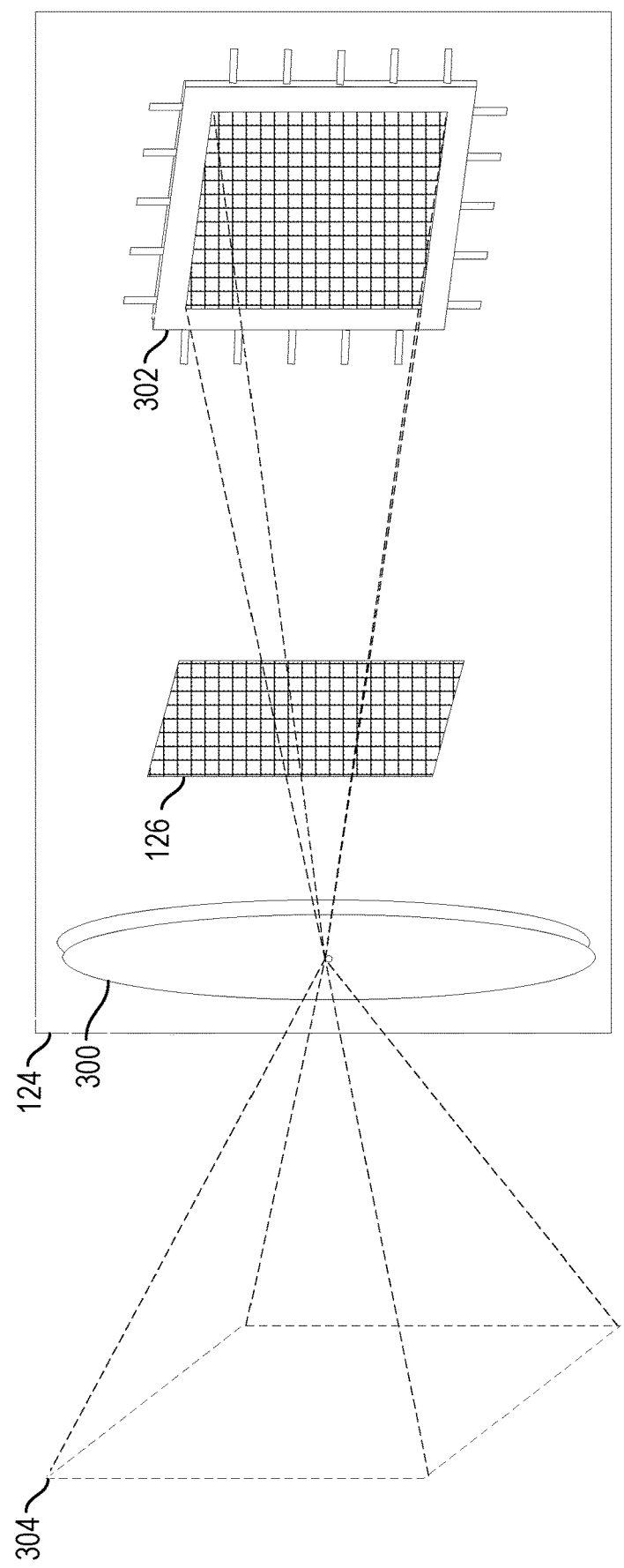
FIG. 3B is a conceptual diagram illustrating an image sensor configured to include a dynamic matrix filter, according to some alternative embodiments.

Although FIG. 3A illustrates the dynamic matrix filter 126 as being separate and distinct from the image sensor 124, it shall be appreciated that, in some embodiments, the dynamic matrix filter 126 is incorporated as a component of the image sensor 124. For example, the lens system 300, focal plane array 302, and dynamic matrix filter 126 may be combined according to the configuration illustration in FIG. 3A (e.g., with the dynamic matrix filter 126 placed in front of the lens system 300), within a common casing, to form an image sensor 124. As another example, as shown in FIG. 3B, in some embodiments, the dynamic matrix filter 126 may be placed in between the lens system 300 and the focal plane array 302 within the image sensor 124.

Figure 4:
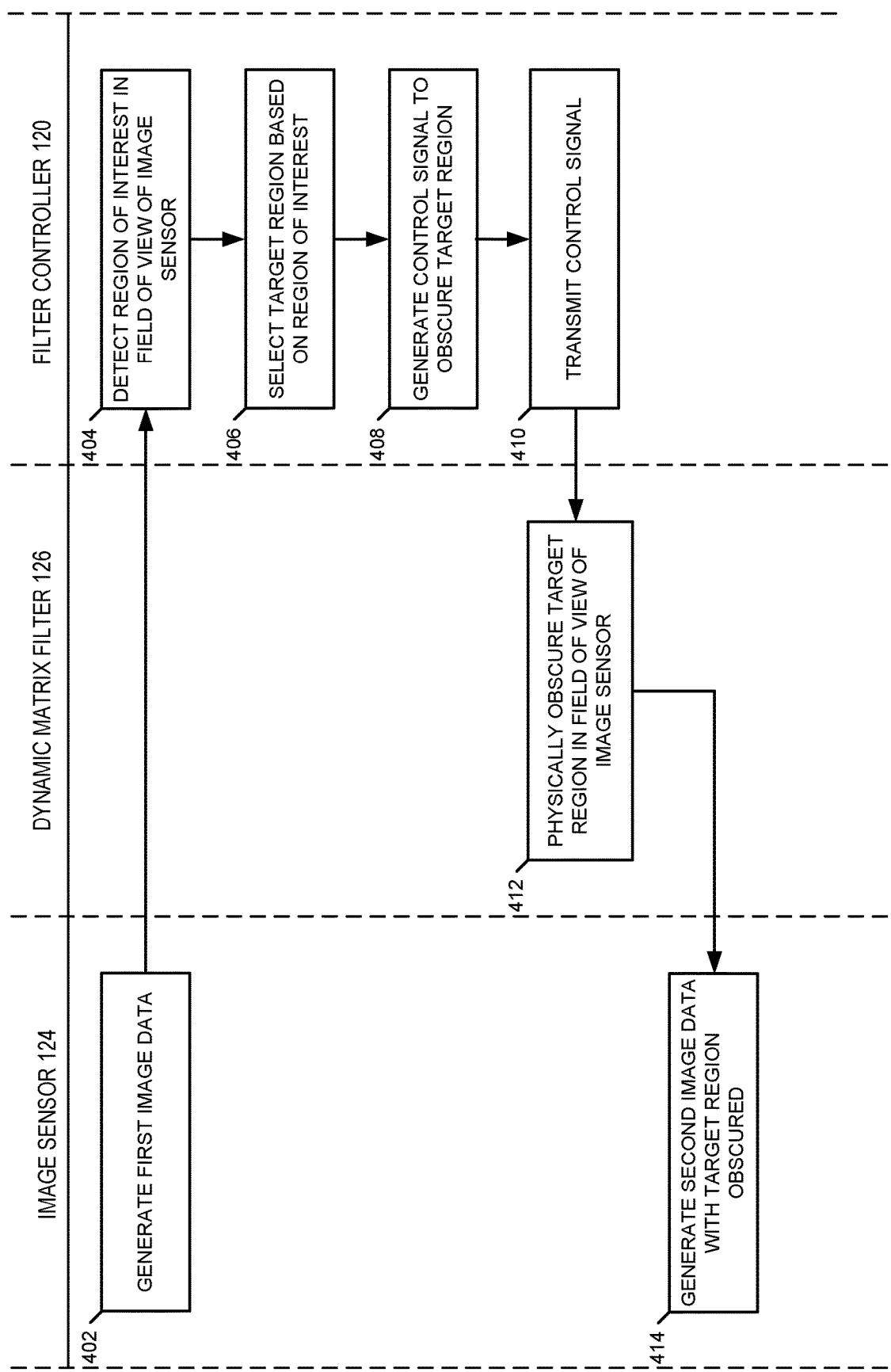
FIG. 4 is an interaction diagram illustrating example operations of the AV system in performing a method for selectively obscuring regions of an image sensor's field of view using a dynamic matrix filter, according to some embodiments.

FIG. 4 is an interaction diagram illustrating example operations of the AV system in performing a method for selectively obscuring regions of an image sensor 124's field of view using a dynamic matrix filter 126, according to some embodiments.

At operation 402, the image sensor 124 generates first image data. The first image data comprises a depiction of a real-world scene that is visible within a field of view of the image sensor 124 during operation of the AV system 100. In an example, the real-world scene includes a traffic signal or sign along with a source of bright light such as the sun or vehicle headlights.

At operation 404, the filter controller 120 detects a region of interest in the field of view of the image sensor 124 such as a traffic signal or bright source of light that is visible within the field of view of the image sensor 124. As will be discussed in further detail below, the filter controller 120 detects the region of interest based on any one or more of map data 128, vehicle pose data, and image data produced by the image sensor 124 or another image sensor.

At operation 406, the filter controller 120 selects a target region in the field of view of the image sensor 124 to obscure based on the region of interest. In some embodiments, the target region in the field of view of the image sensor 124 selected by the filter controller 120 corresponds to the region of interest. In some embodiments, the target region in the field of view of the image sensor 124 corresponds to a region in the field of view of the image sensor 124 other than the region of interest.

At operation 408, the filter controller 120 generates a control signal 202 to cause the dynamic matrix filter 126 to obscure the target region in the field of view of the image sensor 124. The filter controller 120 may generate control signals 202 based on a predetermined mapping between the array of elements 200 and the field of view of the image sensor 124. For example, each element in the array of elements 200 of the dynamic matrix filter 126 may be mapped to a light-sensing pixel in the focal plane array 302. Control signals 202 generated by the filter control 120 specify an optical density for each element in the array of elements 200 that corresponds to the target region and in some instances, the control signal 202 may specify a different optical density for sub-regions within the target region.

At operation 410, the filter controller 120 transmits the control signal 202 to the dynamic matrix filter 126. The controls signal causes the dynamic matrix filter 126 to physically obscure the target region in the field of view of the image sensor 124 in operation 412. More specifically, the control signal 202 causes an increase in optical density of one or more elements in the array of elements 200 that correspond to the target region in the field of view of the image sensor 124.

At operation 414, the image sensor 124 generates second image data with the target region in the field of view of the image sensor 124 having an adjusted optical density. The second image data may comprise a depiction of the real-world scene with a masked-out region corresponding to the obscured target region in the field of view of the image sensor 124.

Figure 5:
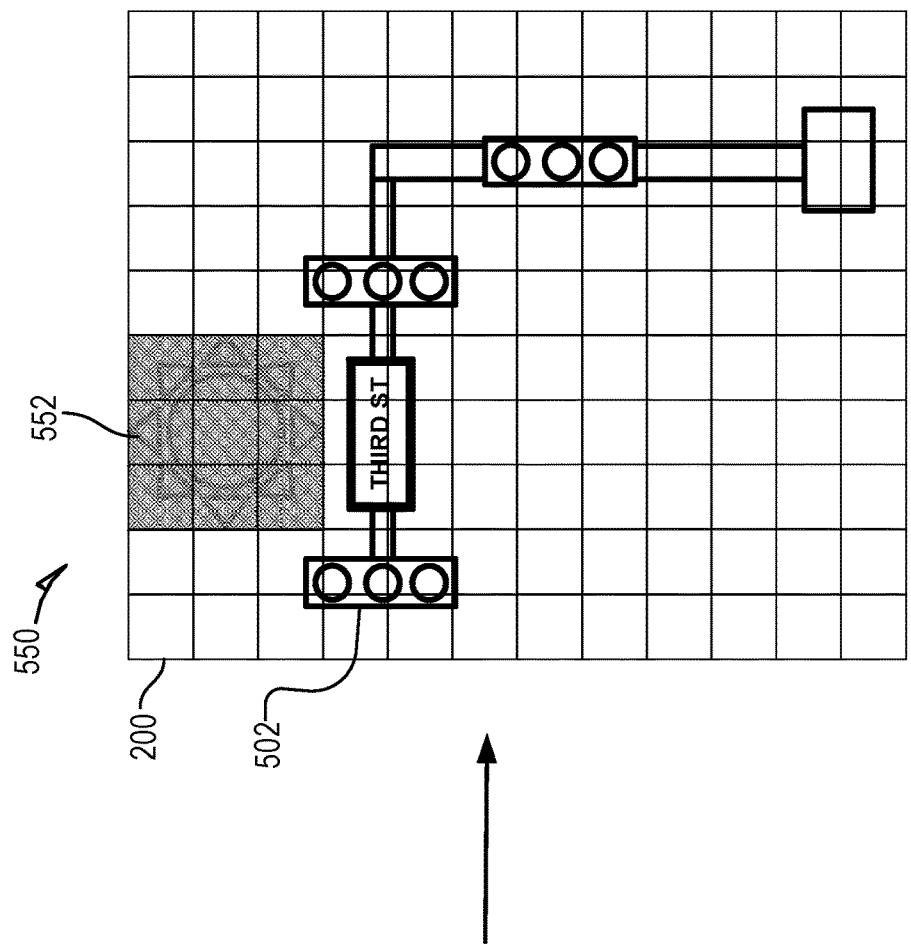
FIG. 5 is a conceptual diagram illustrating an application increased optical density to a region of a field of view of an image sensor, according to some embodiments.
Figure 5:
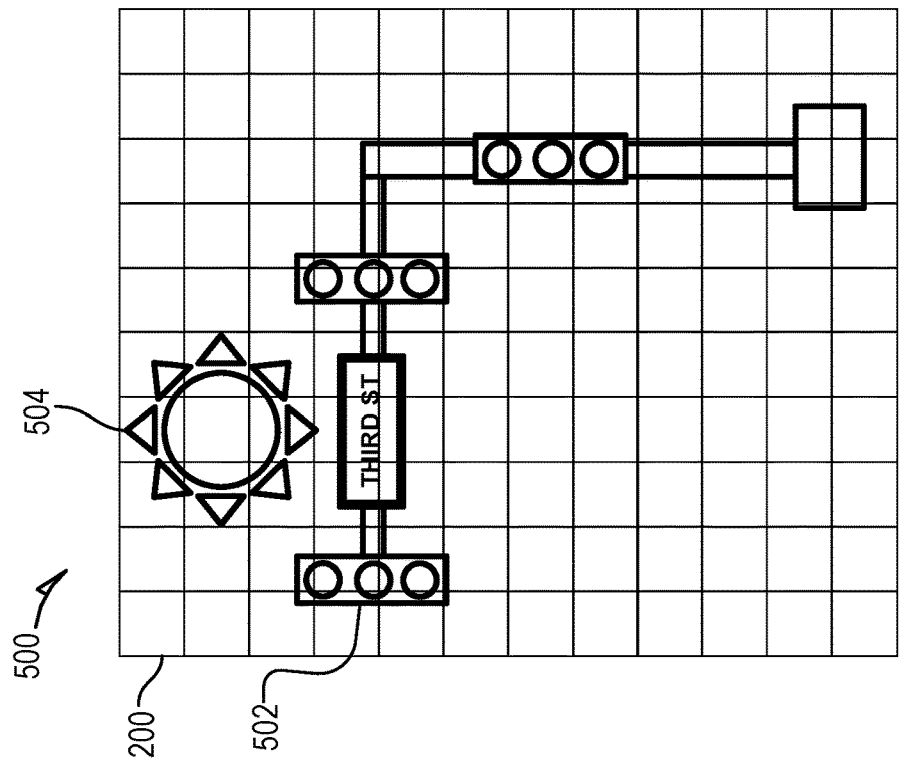

FIG. 5 is a conceptual diagram illustrating an application of increased optical density to a region of a field of view of an image sensor 124, according to some embodiments. With reference to FIG. 5, a scene that is visible within the field of view 500 of the image sensor 124 is shown. A representation of the array of elements 200 of the dynamic matrix filter 126 is illustrated in FIG. 5 overlaid upon the scene. In this example, the scene is depicted in image data (e.g., comprising one or more images) generated by the image sensor 124. The scene includes a traffic signal 502 and a bright source of light in the example of the sun 504. As noted above, the sun 504 may saturate a region of the image data generated by the image sensor 124, which may result in downstream processing systems (e.g., the localizer 106, the perception system 108, the prediction system 110, and the motion planning system 112) being unable perceive the traffic signal 502.

The filter controller 120 may identify a region that encompasses the traffic signal 502 as a region of interest in the field of view 500 of the image sensor 124 based on any one of more of map data 128, vehicle pose data, and image data from the image sensor 124 or another image sensor. The filter controller 120 may select the sun 504 as a target region in the field of view 500 of the image sensor 124 to obscure based on the identified region of interest. The filter controller 120 may further generate and transmit a control signal 202 to the dynamic matrix filter 126 that causes the dynamic matrix filter 126 to increase an optical density of the target region in the field of view 500 of the image sensor 124 to obscure the sun 504.

For example, as shown within an updated field of view 550 of the image sensor 124, a target region 552 corresponding to the sun 504 is obscured. The control signal 202 provided by the filter controller 120 causes an increase to the optical density of a set of elements within the array of elements 200 of the dynamic matrix filter 126 thereby resulting in the target region 552 of the field of view 550, corresponding to the sun 504, to be obscured. The image sensor 124 may generate additional image data with the target region 552 in the field of view 550 having the increased optical density that obscures the sun 504 thereby reducing or possibly eliminating the saturation in the image data that would otherwise pose difficulties to the downstream processing systems.

FIGS. 6-11 are flowcharts illustrating example operations of the AV system 100 in performing a method 600 for selectively obscuring regions of an image sensor 124's field of view using a dynamic matrix filter 126, according to some embodiments. The method 600 may be embodied in computer-readable instructions for execution by a hardware component (e.g., a processor) such that the operations of the method 600 may be performed by one or more components of the AV system 100. Accordingly, the method 600 is described below, by way of example with reference thereto. However, it shall be appreciated that the method 600 may be deployed on various other hardware configurations and is not intended to be limited to deployment on the AV system 100.

At operation 605, the image sensor 124 generates first image data. The first image data comprises a depiction of a real-world scene that is visible within a field of view of the image sensor 124 during operation of the AV system 100. In an example, the real-world scene includes a traffic signal or sign along with a source of bright light such as the sun or vehicle headlights.

At operation 610, the filter controller 120 detects a region of interest in a field of view of the image sensor 124. As an example, the filter controller 120 may detect a traffic signal that is visible within the field of view of the image sensor 124. As another example, the filter controller 120 may detect a bright source of light such as the sun or vehicle headlights that is visible within the field of view of the image sensor 124. The filter controller 120 may detect the region of interest based on any one or more of map data 128, vehicle pose data, and image data produced by the image sensor 124 or another image sensor. Further details regarding the detecting of the region of interest are discussed below in reference to FIGS. 7 and 8, consistent with some embodiments.

At operation 615, the filter controller 120 selects a target region in the field of view of the image sensor 124 based on the region of interest. In some embodiments, the target region in the field of view of the image sensor 124 selected by the filter controller 120 corresponds to the region of interest. In some embodiments, the target region in the field of view of the image sensor 124 corresponds to a region other than the region of interest. Further details regarding the selecting of the target region in the field of view of the image sensor 124 are discussed below in reference to FIGS. 7 and 8, consistent with some embodiments.

At operation 620, the filter controller 120 adjusts an optical density of the target region in the field of view of the image sensor 124. In adjusting the optical density of the target region, the filter controller 120 generates and transmits a control signal to the dynamic matrix filter 126 that causes the dynamic matrix filter 126 to adjust the optical density of one or more elements in an array of elements 200 that form the dynamic matrix filter 126. For example, the control signal may the optical density of one or more elements in the array of elements 200 to be increased from a default optical density (e.g., transparent) to an optical density value specified in the control signal. In embodiments in which the target region corresponds to the region of interest, the filter controller 120 generates a control signal to cause the dynamic matrix filter 126 to physically obscure a region of the field of view of the image sensor 124 corresponding to the region of interest. In embodiments in which the target region corresponds to a region in the first image data other than the region of interest, the filter controller 120 generates a control signal to cause the dynamic matrix filter 126 to physically obscure a region in the field of view of the image sensor 124 that corresponds to a region in the image data other than the region of interest (e.g., the remaining region(s) in the image data)

At operation 625, the image sensor 124 generates second image data with the target region in the field of view of the image sensor 124 having an adjusted optical density. The second image data may comprise a depiction of the real-world scene with a masked-out region corresponding to the obscured target region in the field of view of the image sensor 124.

Figure 6:
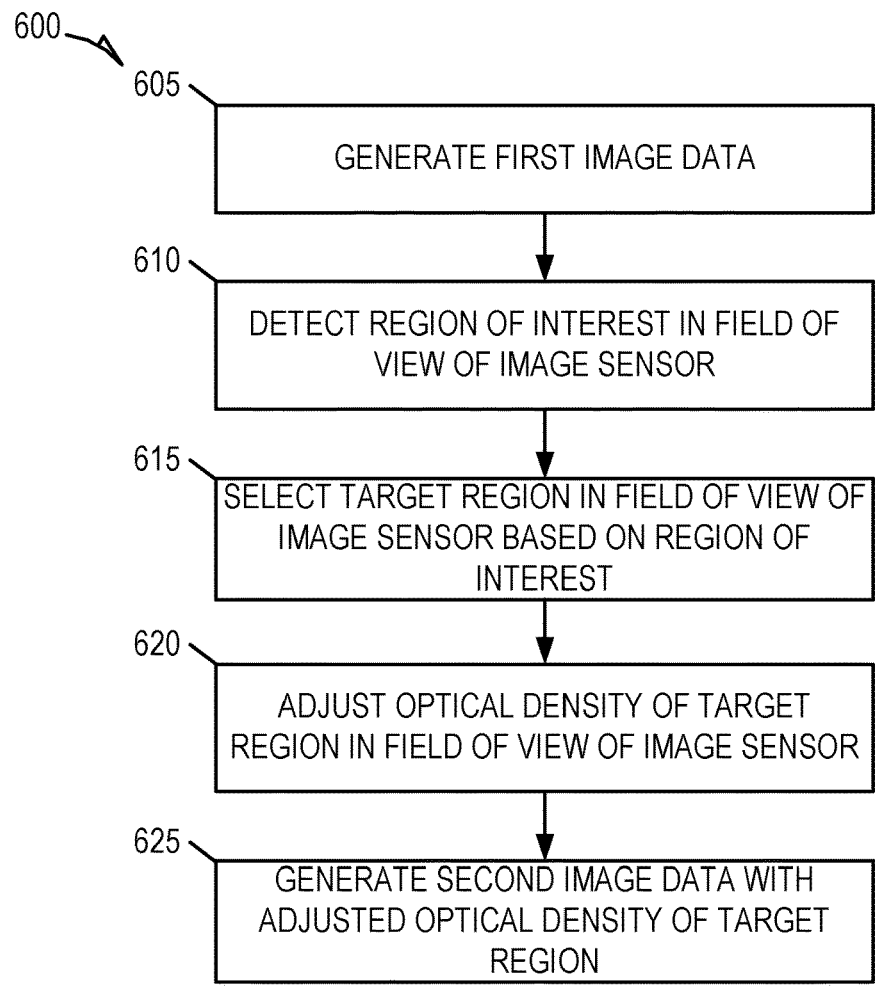
FIGS. 6-11 are flowcharts illustrating example operations of the AV system in performing a method for selectively obscuring regions of an image sensor's field of view using a dynamic matrix filter, according to some embodiments.
Figure 7:
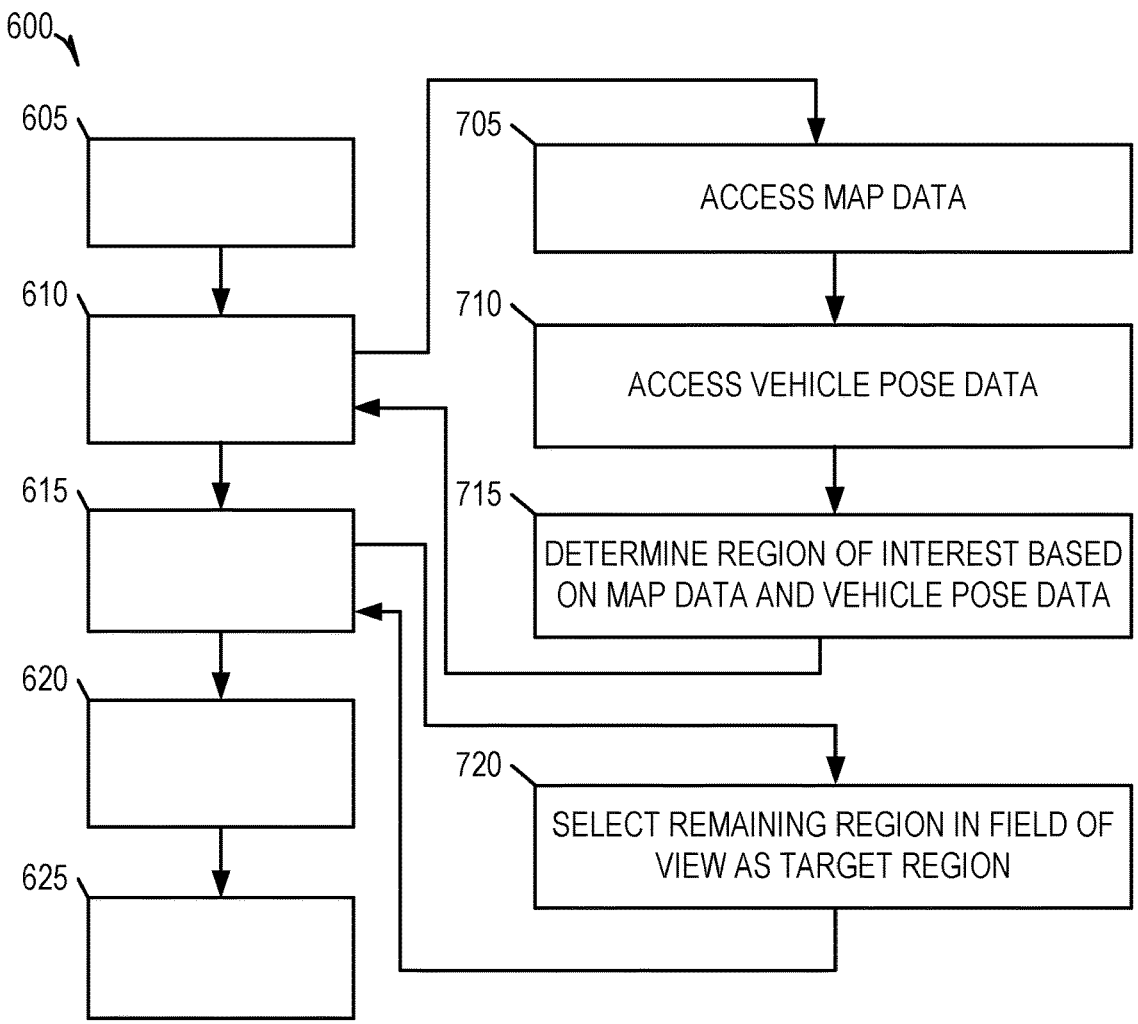

As shown in FIG. 6, the method 600 may, in some embodiments, include one or more of operations 705, 710, 715, and 720. Consistent with these embodiments, the operations 705, 710, and 715 may be performed as part of operation 610 (e.g., as a sub-routine or algorithm) where the filter controller 120 detects the region of interest in the field of view of the image sensor 124.

At operation 705, the filter controller 120 accesses map data 128. The map data 128 includes a map of an area that includes the real-world scene depicted in the first image data and information that describes locations of features in the area such as locations of traffic signals and signs.

At operation 710, the filter controller 120 accesses vehicle pose data. The vehicle pose data includes a position and orientation of the AV system 100.

At operation 715, the filter controller 120 determines the region of interest in the field of view of the image sensor 124 based on the map data 128 and the vehicle pose data. For example, the filter controller 120 may determine that a traffic signal or sign is depicted within a particular region of the first image data based on comparing the orientation and position of the AV system 100 with the information that describes the locations of the traffic signal or sign within the area. The filter controller 120 may identify the region of interest in the field of view of the image sensor 124 based on the region in the first image data that includes the depiction of the traffic signal or sign. For example, the filter controller 120 may maintain and utilize a predetermined mapping between pixels in image data generated by the image sensor 124 and pixels in the focal plane array 302 of the image sensor 124, which are correlated with regions in the field of view of the image sensor 124.

Consistent with these embodiments, operation 720 may be performed as part of operation 615, where the filter controller 120 selects the target region in the field of view of the image sensor 124. At operation 720, the filter controller 120 maps a remaining region in the first image data to the target region of the field of view of the image sensor 124. The remaining region in the first image excludes the region of interest. The filter controller 120 may map a region in image data generated by the image sensor 124 based on a predetermined mapping between regions of image data (e.g., pixels in the image) and regions of the field of view of the image sensor 124 (e.g., pixels in the focal plane array 302).

Figure 8:
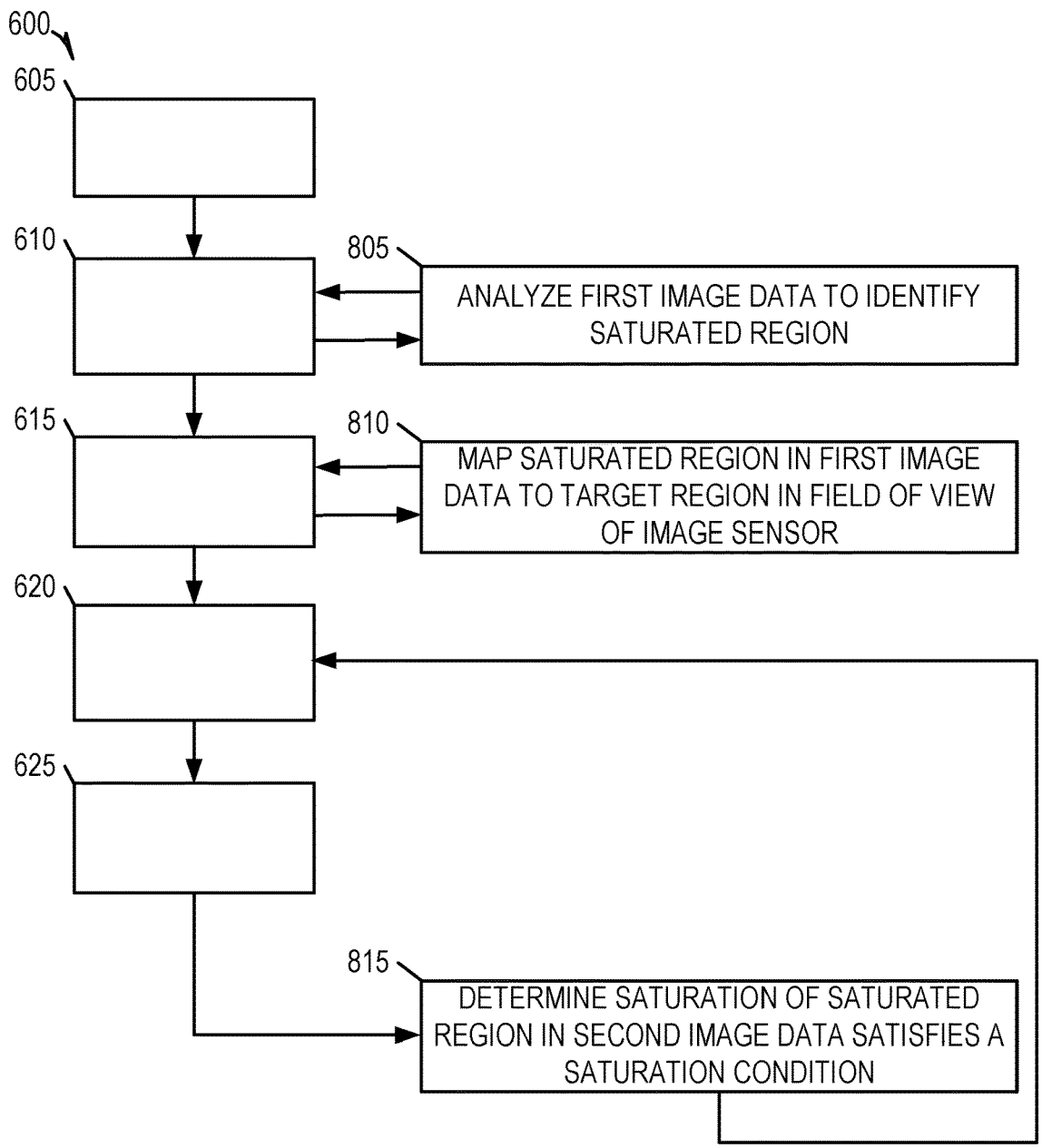

As shown in FIG. 8, the method 600 may, in some embodiments, include any one or more of operations 805, 810, and 815. Consistent with these embodiments, the operations 805 may be performed as part of the operation 610 where the filter controller 120 detects a region of interest in the field of view of the image sensor 124 based on the first image data. At operation 805, the filter controller 120 analyzes the first image data to identify a saturated region. That is, the filter controller 120 performs an image analysis to identify a region in the image that satisfies a saturation condition. For example, the filter controller 120 may identify a region in the image that has a saturation that exceeds a predetermined saturation threshold.

Consistent with these embodiments, the operation 810 may be performed as part of the operation 615 where the filter controller 120 selects a target region in the field of view of the image sensor 124. At operation 810, the filter controller 120 maps the saturated region in the first image data to the target region in the field of view of the image sensor 124.

Consistent with these embodiments, the operation 815 may be performed subsequent to operation 625 where the image sensor 124 generates second image data. At operation 815, the filter controller 120 determines if a saturation of a region in the second image data satisfies the saturation constraint. The region in the second image data corresponds to the target region in the field of view of the image sensor 124, which corresponds to the saturated region in the first image data. Following the example from above, the filter controller 120 may determine that the saturation of the region in the second image data exceeds the saturation threshold. Based on determining the saturation of the region in the second image data satisfies the saturation constraint, the method returns to operation 620 where the filter controller 120 again adjusts the optical density of the target region of the field of view of the image sensor 124. In adjusting the optical density, the filter controller 120 may further increase the optical density. For example, the filter controller 120 may initially change the optical density of the target region to a first optical density and based on determining the region in the second image data satisfies the saturation condition, the filter controller 120 may change to optical density of the target region to a second optical density that is greater than the first optical density.

Figure 9:
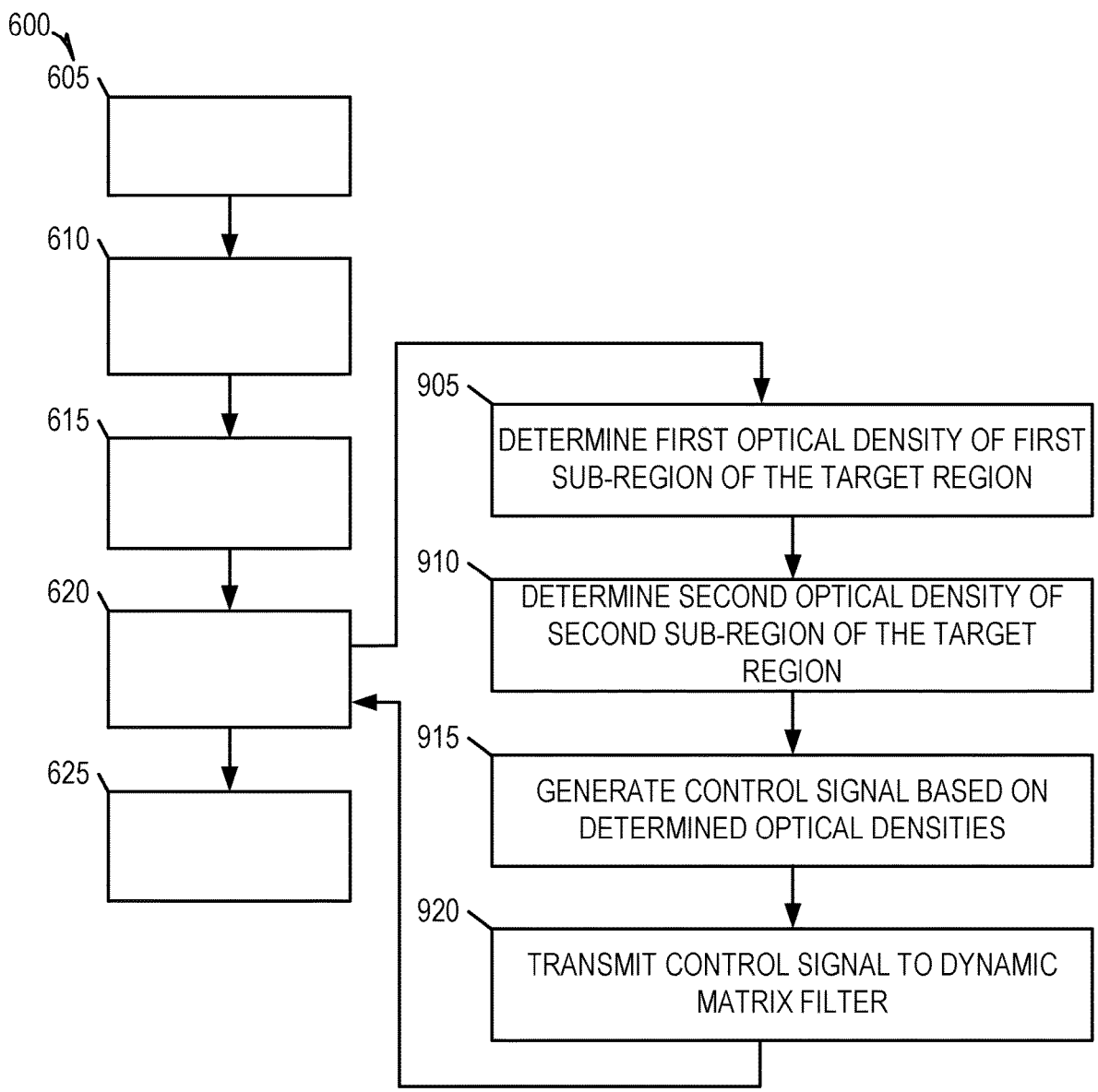

As shown in FIG. 9, the method 600 may, in some embodiments, include operations 905, 910, 915, and 920. Consistent with these embodiments, the operations 905, 910, 915, and 920 may be performed as part of the operation 620 where the filter controller 120 adjusts the optical density of the target region in the field of view of the image sensor 124.

At operation 905, the filter controller 120 determines a first optical density of a first sub-region of the target region of the field of view of the image sensor 124. At operation 910, the filter controller 120 determines a second optical density of a second sub-region of the target region of the field of view of the image sensor 124. As an example of the forgoing, if the first image data depicts a real-world scene that includes a bright source of light and a traffic signal, the traffic signal may be detected as the region of interest and the selected target region in the field of view of the image sensor 124 corresponds to the remainder of the image. The filter controller 120 may determine a high optical density for a first sub-region of the target region corresponding to the sun, and determine a moderate optical density for a second sub-region of the target region corresponding to everything else but the traffic signal.

At operation 915, the filter controller 120 generates a control signal based on the first and second optical density and the filter controller 120 transmits the control signal to the dynamic matrix filter 126 at operation 920. The control signal causes the dynamic matrix filter 126 to adjust the optical density of a first set of elements in the array of elements 200 corresponding to the first sub-region of the target region and to adjust the optical density of a second set of elements in the array of elements 200 corresponding to the second sub-region. In particular, the dynamic matrix filter 126 adjusts the first set of elements according to the first optical density and adjusts the second set of elements according to the second optical density.

Figure 10:
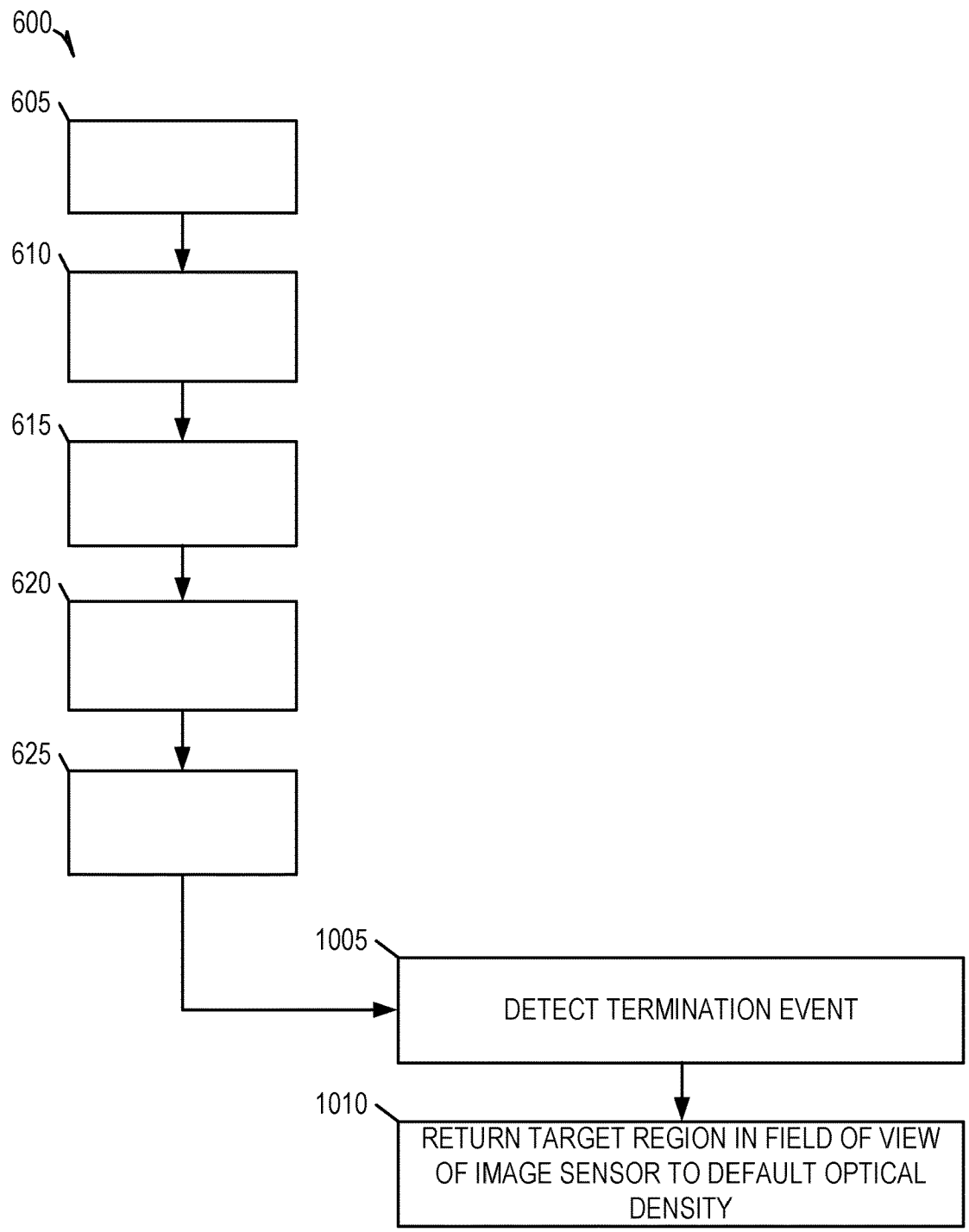

As shown in FIG. 10, the method 600 may, in some embodiments, include operations 1005 and 1010. Consistent with these embodiments, the operations 1005 and 1010 may be performed subsequent to operation 625 where the image sensor 124 generates the second image data. At operation 1005, the filter controller 120 detects a termination event. The termination event may, for example, comprise any one or more of: a predetermined amount of time elapsing since the adjustment to the optical density of the target region, a predetermined number of image frames being generated by the image sensor 124 since the adjustment to the optical density of the target region, or a change in location of the AV system 100.

At operation 1010, the filter controller 120 returns the target region 552 of the field of view of the image sensor 124 to a default optical density (e.g., transparent). In returning the target region to the default optical density, the filter controller 120 generates and transmits a control signal to the dynamic matrix filter 126 that causes the dynamic matrix filter 126 to decrease the optical density of one or more elements in the array of elements 200 with an increased optical density back down to the default optical density.

Figure 11:
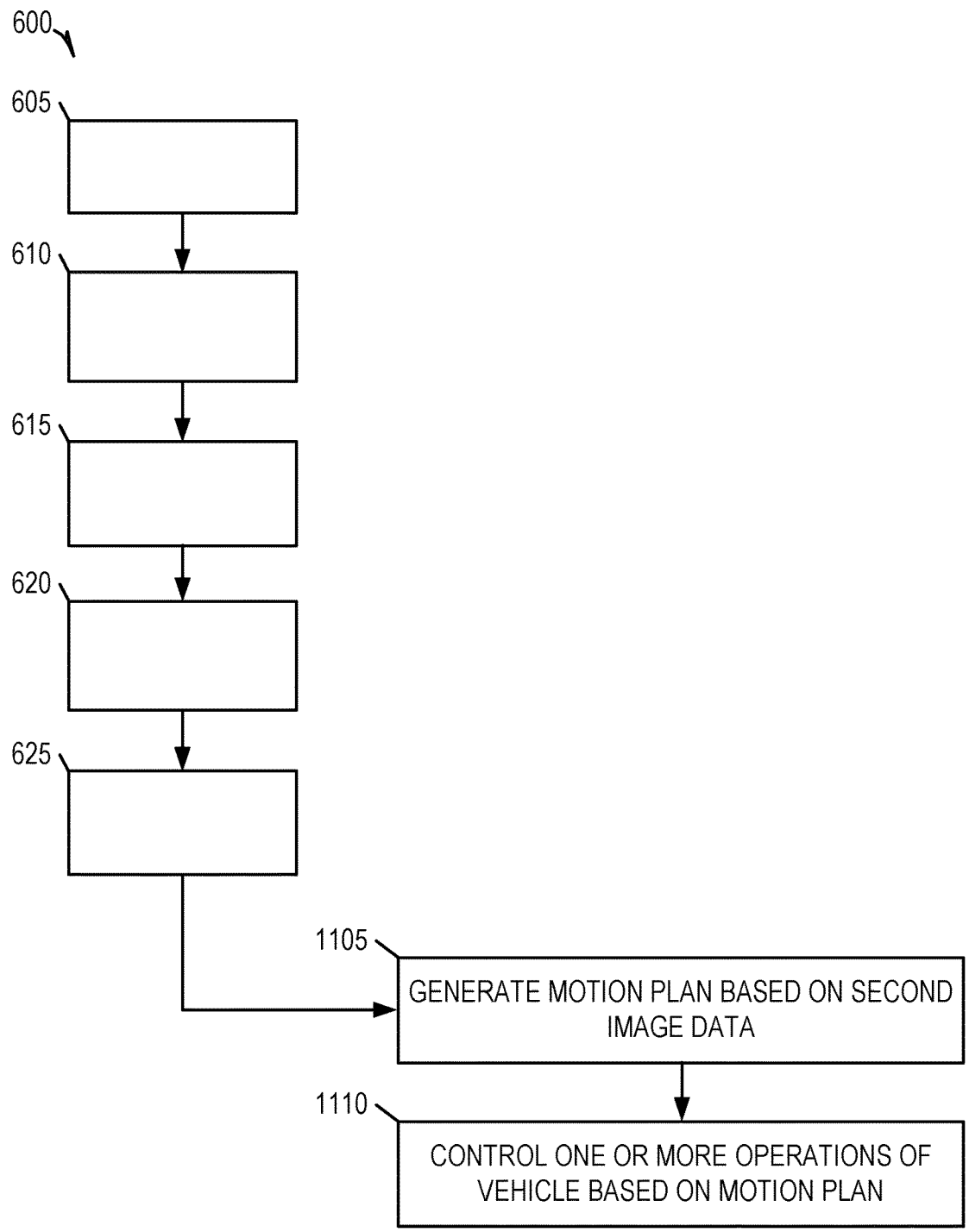

As shown in FIG. 11, the method 600 may, in some embodiments, include operations 1105 and 1110. Consistent with these embodiments, the operations 1105 and 1110 may be performed subsequent to operation 625 where the image sensor 124 generates the second image data. At operation 1105, the motion planning system 112 generates a motion plan for the AV system 100 based in part on the second image data. At operation 1110, the vehicle controller 114 controls one or more operations of the AV system 100 based on the motion plan.

Figure 12:
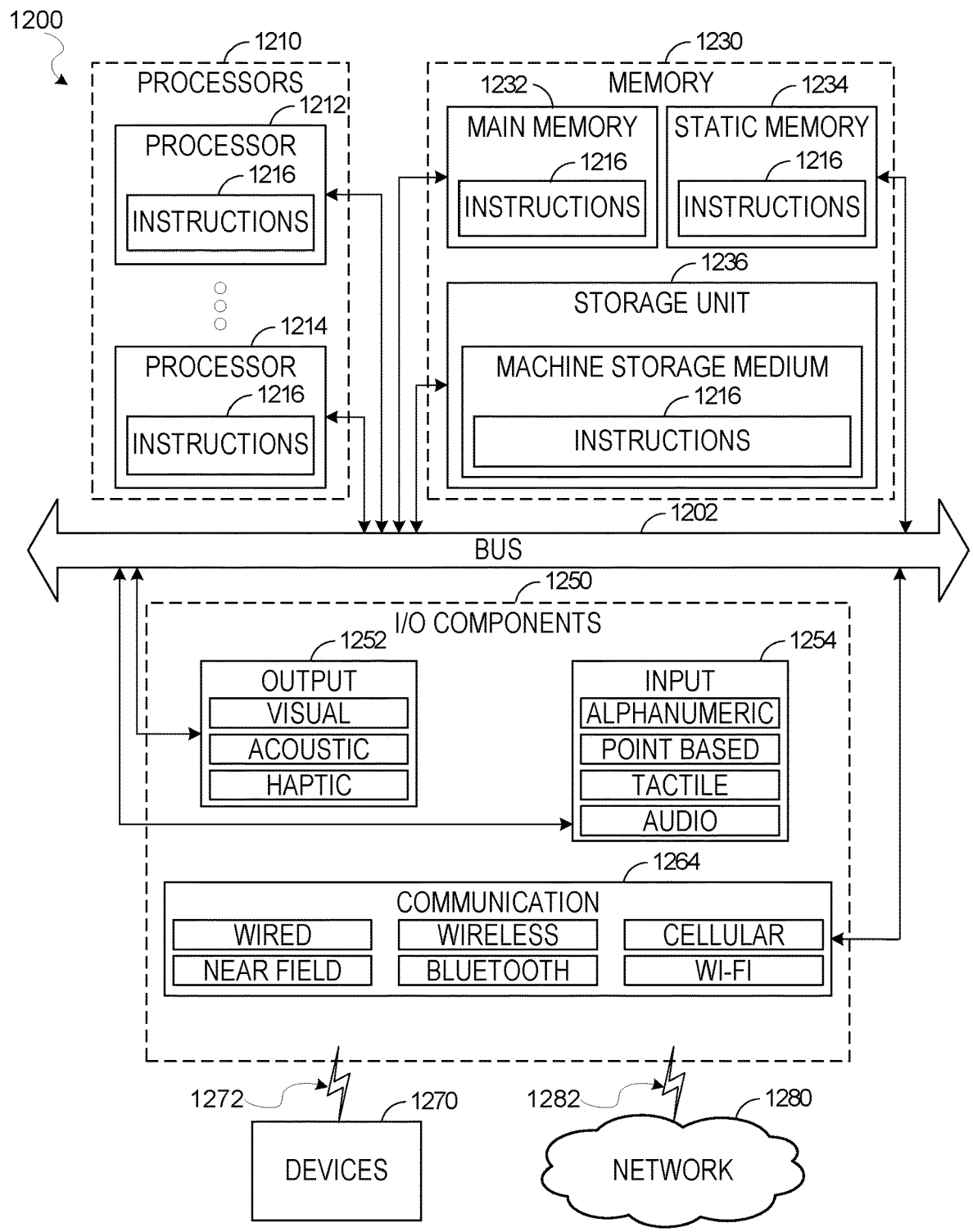
FIG. 12 is a diagrammatic representation of a machine in the example form of a computer system within which a set of instructions for causing the machine to perform any one or more of the methodologies discussed herein may be executed.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 600. In this way, the instructions 1216 transform a general, non-programmed machine into a particular machine 1200, such as the vehicle computing system 102, that is specially configured to carry out the described and illustrated functions in the manner described here. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and input/output (I/O) components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, the machine 1200 may include a single processor 1212 with a single core, a single processor 1212 with multiple cores (e.g., a multi-core processor), multiple processors 1210 with a single core, multiple processors 1210 with multiple cores, or any combination thereof.

The memory 1230 may include a main memory 1232, a static memory 1234, and a storage unit 1236, both accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, and other communication components to provide communication via other modalities. The devices 1270 may be another machine or any of a wide variety of peripheral devices (e.g., a peripheral device coupled via a universal serial bus (USB)).

Executable Instructions and Machine Storage Medium

The various memories (e.g., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to processors 1210. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A sensor system for an autonomous vehicle (AV), the sensor system comprising:
   at least one processor programmed to perform operations comprising:
   detecting a region of interest in a field of view of an image sensor;
   selecting a target region in the field of view of the image sensor based on the region of interest in the field of view;

modifying a first element optical density for a first element of a dynamic matrix filter from a first optical density to a modified optical density, the first element being associated with the target region in the field of view of the image sensor;

generating first image data with the target region, the first element, and a second element of the dynamic matrix filter being in the field of view of the image sensor, the generating using the dynamic matrix filter with the first element having the modified optical density and the second element having a second optical density different than the modified optical density;

determining a change to a pose of the autonomous vehicle; and based on determining the change to the pose of the autonomous vehicle, causing the dynamic matrix filter to set the first element of the dynamic matrix filter to the first optical density.

2. The sensor system of claim 1, the detecting of the region of interest comprising:

accessing map data comprising a map of an area that is a current location of the autonomous vehicle;

accessing vehicle pose data comprising a position and an orientation of the autonomous vehicle; and determining the region of interest in the field of view of the image sensor based on the map data and vehicle pose data.

3. The sensor system of claim 2, the selecting of the target region in the field of view of the image sensor comprising selecting a remaining region in the field of view of the image sensor as the target region, the remaining region excluding the region of interest.

4. The sensor system of claim 1, the operations further comprising:

analyzing prior image data to identifying a saturated region, the prior image data being generated before the generating of the first image data; and mapping the saturated region in the prior image data to the target region in the field of view of the image sensor.

5. The sensor system of claim 4, the operations further comprising determining that a saturation of the saturated region in the first image data satisfies a saturation condition.

6. The sensor system of claim 1, the operations further comprising:

generating a control signal that causes the dynamic matrix filter to apply the modified optical density to a first portion of the dynamic matrix filter, the first portion of the dynamic matrix filter comprising the first element; and transmitting the control signal to the dynamic matrix filter.

7. The sensor system of claim 1, the operations further comprising changing an optical density of the first element from a default optical density to the modified optical density.

8. The sensor system of claim 1, the operations further comprising increasing an optical density of the first element.

9. An autonomous vehicle control system for an autonomous vehicle (AV), the autonomous vehicle control system, comprising:

at least one processor programmed to perform operations comprising:

detecting a region of interest in a field of view of an image sensor;

selecting a target region in the field of view of the image sensor based on the region of interest in the field of view;

modifying a first element optical density for a first element of a dynamic matrix filter from a first optical density to a modified optical density, the first element being associated with the target region in the field of view of the image sensor;

generating first image data with the target region, the first element, and a second element of the dynamic matrix filter being in the field of view of the image sensor, the generating using the dynamic matrix filter with the first element having the modified optical density and the second element having a second optical density different than the modified optical density;

determining a change to a pose of the autonomous vehicle; and based on determining the change to the pose of the autonomous vehicle, causing the dynamic matrix filter to set the first element of the dynamic matrix filter to the first optical density.

10. The autonomous vehicle control system of claim 9, the detecting of the region of interest comprising:

accessing map data comprising a map of an area that is a current location of the autonomous vehicle;

accessing vehicle pose data comprising a position and an orientation of the autonomous vehicle; and determining the region of interest in the field of view of the image sensor based on the map data and vehicle pose data.

11. The autonomous vehicle control system of claim 10, the selecting of the target region in the field of view of the image sensor comprising selecting a remaining region in the field of view of the image sensor as the target region, the remaining region excluding the region of interest.

12. The autonomous vehicle control system of claim 9, the operations further comprising:

analyzing prior image data to identifying a saturated region, the prior image data being generated before the generating of the first image data; and mapping the saturated region in the prior image data to the target region in the field of view of the image sensor.

13. The autonomous vehicle control system of claim 12, the operations further comprising determining that a saturation of the saturated region in the first image data satisfies a saturation condition.

14. The autonomous vehicle control system of claim 9, the operations further comprising:

generating a control signal that causes the dynamic matrix filter to apply the modified optical density to a first portion of the dynamic matrix filter, the first portion of the dynamic matrix filter comprising the first element; and transmitting the control signal to the dynamic matrix filter.

15. The autonomous vehicle control system of claim 9, the operations further comprising changing an optical density of the first element from a default optical density to the modified optical density.

16. The autonomous vehicle control system of claim 9, the operations further comprising increasing an optical density of the first element.

17. An autonomous vehicle (AV), comprising:

at least one processor programmed to perform operations comprising:

detecting a region of interest in a field of view of an image sensor associated with the AV;

selecting a target region in the field of view of the image sensor based on the region of interest in the field of view;

modifying a first element optical density for a first element of a dynamic matrix filter from a first optical density to a modified optical density, the first element being associated with the target region in the field of view of the image sensor;

generating first image data with the target region, the first element, and a second element of the dynamic matrix filter being in the field of view of the image sensor, the generating using the dynamic matrix filter with the first element having the modified optical density and the second element having a second optical density different than the modified optical density;

determining a change to a pose of the autonomous vehicle; and based on determining the change to the pose of the autonomous vehicle, causing the dynamic matrix filter to set the first element of the dynamic matrix filter to the first optical density.

18. The autonomous vehicle of claim 17, the detecting of the region of interest comprising:

accessing map data comprising a map of an area that is a current location of the autonomous vehicle;

accessing vehicle pose data comprising a position and an orientation of the autonomous vehicle; and determining the region of interest in the field of view of the image sensor based on the map data and vehicle pose data.

19. The autonomous vehicle of claim 18, wherein the selecting of the target region in the field of view of the image sensor comprises:

selecting a remaining region in the field of view of the image sensor as the target region, the remaining region excluding the region of interest.

20. The autonomous vehicle of claim 17, the operations further comprising:

analyzing prior image data to identifying a saturated region, the prior image data being generated before the generating of the first image data; and mapping the saturated region in the prior image data to the target region in the field of view of the image sensor.

21. The autonomous vehicle of claim 20, the operations further comprising determining that a saturation of the saturated region in the first image data satisfies a saturation condition.

22. The autonomous vehicle of claim 17, the operations further comprising:

generating a control signal that causes the dynamic matrix filter to apply modified optical density to a first portion of the dynamic matrix filter, the first portion of the dynamic matrix filter comprising the first element; and transmitting the control signal to the dynamic matrix filter.

23. The autonomous vehicle of claim 17, the operations further comprising changing an optical density of the first element from a default optical density to the modified optical density.

24. The autonomous vehicle of claim 17, the operations further comprising increasing an optical density of the first element.

25. The sensor system of claim 1, the first optical density being a default optical density.

26. The autonomous vehicle control system of claim 9, the first optical density being a default optical density.

27. The sensor system of claim 1, the change to the pose of the autonomous vehicle comprising at least one of a change to a position of the autonomous vehicle or a change to an orientation of the autonomous vehicle.

* * * * *